United States Patent [19]

Pettis

[11] 3,922,490

[45] Nov. 25, 1975

[54] ALARM AND UTILITY METER READING SYSTEM EMPLOYING TELEPHONE LINES

[76] Inventor: Charles D. Pettis, 2304 Stanley Ave., Las Vegas, Nev. 89101

[22] Filed: June 18, 1973

[21] Appl. No.: 370,975

[52] U.S. Cl. ........... 179/2 A; 340/149; 340/177 VA

[51] Int. Cl.[2] ........................................ H04M 11/00

[58] Field of Search 340/149, 180, 177 VA, 177 VZ; 179/2 A, 2 R, 5 R; 324/62 R, 65 R, 115,

[56] References Cited

UNITED STATES PATENTS

| | | | |
|---|---|---|---|
| 3,142,726 | 7/1964 | Brothman et al. | 179/2 A |
| 3,484,553 | 12/1969 | Lovell | 179/2 R |
| 3,588,889 | 6/1971 | Schulein | 340/149 |

*Primary Examiner*—Kathleen H. Claffy
*Assistant Examiner*—Tommy P. Chin
*Attorney, Agent, or Firm*—John E. Wagner

[57] ABSTRACT

Disclosed is a system for utilizing existing telephone subscriber lines during ON hook conditions for low level direct current signalling. The system employs basically a stepped resistance element connected across the subscriber line with remote switches for short circuiting discrete resistance steps.

Employing binary encoded resistance steps a large number of signalling conditions may be transmitted with the stepped resistance element acting as an extremely simple encoder. Utility meters may be easily monitored.

The resistance element and sensor switches are connected in simple logical arrangements whereby many identifiable signals may be sent including fail safe and test information.

20 Claims, 6 Drawing Figures

ALARM AND UTILITY METER READING SYSTEM EMPLOYING TELEPHONE LINES

BACKGROUND OF THE INVENTION

The vast telephone subscriber network with its subscriber lines connected to virtually every home and business has long been recognized as a potential data retrieval system in addition to carrying voice.

This recognition is based upon a statistically established fact that the typical subscriber line is in use only a small percentage of the time.

Based upon the availability of subscriber lines for auxilliary use, systems such as data transmission systems such as the Bell System Dataphone have been developed. Private alarm systems employ leased telephone lines and some systems employ the existing subscriber line for alarm signalling employing equipment at the subscriber station which automatically dials a prescribed number and conveys a prerecorded message in the case of an alarm condition.

Characteristic of such systems, the installation at the subscriber station is complex and expensive. Consequently, the potential subscriber line use for auxiliary signalling is still virtually untapped. A significant advance in the direction of subscriber signalling employing simplified equipment at the subscriber station is illustrated in the U.S. Pat. No. 3,484,553 to C. A. Lovell, issued Dec. 16, 1969. This patent employs a variety of types of signalling devices across the line intended to afford the signalling function without interference with the regular telephone usage. These devices are all simple compared with the prior art, however, all embodyments require some components which are expensive or must be replaced or reset after a single operation and are located at the subscribers premises.

BRIEF STATEMENT OF THE INVENTION

Given the foregoing prior art, I have invented a subscribers signalling system in which the basic signalling device located at the subscriber's station comprises a stepped resistance element wherein each step of the resistance element is controlled by a data or signal source such as a simple switch. Given a four step resistance element, as many as sixteen discrete signals may be sent.

I have carefully designed my system to avoid interference with normal line parameters both in the ON and OFF hook conditions.

In typical installation, the subscriber installation includes a multiple step resistance element having binary weighted values such as 8,000 ohms, 4,000 ohms, 2,000 ohms and 1,000 ohms along with an adjustable resistance to establish a normal loop resistance at the subscribers station in the order of 6,000 to 10,000 ohms. Associated with each incremental resistance is a pair of switch contacts controlled by some signalling devices such as a fire or smoke sensors, intrusion sensors, dials on utility meters or even YES/NO switches for YES or NO responses to questions proposed through this or other media for various uses such as nationwide public opinion polls.

In each of these types of signalling, the device at the subscribers premises is basically a stepped resistance element and an array of switches.

One major feature of this invention resides in the fact that the signalling system does not, in any way interfere with the normal telephone usage in any respect and the operation of any signal does not require any resetting to restore the communication system. Any signalling condition occurring during telephone usage and remaining after receiver return to the cradle will be available for reading.

Also characteristic of this system is the feature that the central office needs only the following basic elements to monitor and decode information from a large number of subscribers:

a. a time division multiplexer;

b. current or voltage level measuring device;

c. simple logic circuitry to decode the levels into signal conditions;

d. a memory where signalling involves accumulation such as utility power or gas consumption;

e. display of some type.

One other aspect of this invention when established for monitoring utilities meter consumption is that with the establishment of one way communications, it is easily possible to transmit supervisory or control signals to the subscriber's installation. For example, with the present recognition of power shortages, the same communications link may be used with appropriate switching and valving at the subscribers premises to selectively control or limit consumption. For example, in periods of peak power demand, a control signal can be used to open the electrical circuit of "non essential circuits" such as air conditioners and the like.

These various ramifications are all the result of the ability employing this invention to install a simple data installation of slight cost in virtually any subscriber installation. With such initial installation, the addition of the signalling and control functions from the utility or other source subscriber may easily be added.

BRIEF DESCRIPTION OF THE DRAWINGS

The foregoing brief description of the invention may be more clearly understood from the following detailed description and by reference to the drawings in which.

DETAILED DESCRIPTION OF THE INVENTION

Figures 1, 2, 3:
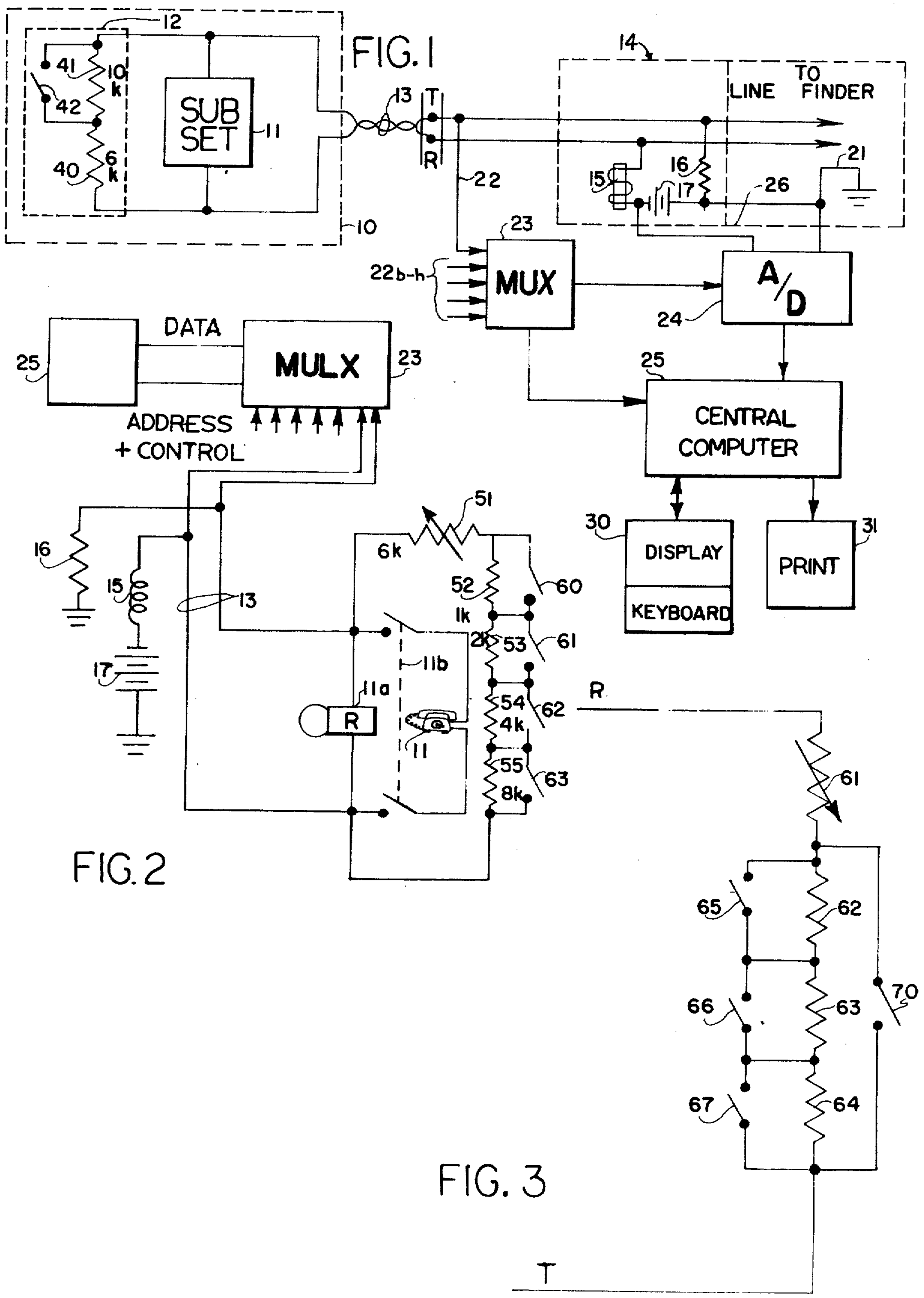
FIG. 1 is a simplified block diagram of the simplest form of this invention.
FIG. 2 is a block diagram of a typical subscriber installation in accordance with this invention.
FIG. 3 is an electrical schematic of an alternate form of subscriber signalling subset.

Now referring to FIG. 1, a single subscriber station 10 including a telephone subset 11 and a subscriber signal set 12 in accordance with this invention may be seen. The signal set 12 is connected in parallel with the subset 11 either at an existing wall terminal, at the subset 11 or any suitable location.

The substation 10 is connected via a link 13 which typically is a twisted pair to a main frame or suitable terminal at the associated PBX, PABX or central office represented as central office 14. For simplicity sake, the central office 14 is illustrated in its simplest form showing only the components associated with the particular subset. These components include a line relay 15, a resistance 16 to ground, line relay battery 17 and ground 21.

The central office equipment associated with this system is basically a conductor 22 connected to one side of the subscribers pair, for example, to the tip (T) side of the line. This line along with others served by the same central system is introduced into a time division multiplexer 23 which is represented simply as a box with a plurality of switches, each of which is sequentially and separately closed to scan the currrent or voltage of the lead 22 and its counterpart leads 22*b* . . . n.

The output of the multiplexer 23 is introduced into an analog to digital converter (A/D) 24 to convert the current or voltage reading into a format suitable for handling by a digital computer 25. The A/D converter 24 requires reference current or voltage input and these are obtained via leads 26 from the line relay office battery 17 and ground 21.

The multiplexer 23, A/D converter 24, central computer 25 and its associated display 30 and/or printer 31 may be located at the telephone central office, at a PBX or PABX installation or at a nearby or remote location.

The main feature of this invention resides in the signalling subset 12 illustrated in its simplest form. It includes basically a pair of series connected resistance elements 40 and 41 having predetermined values such as 6K and 10K respectively. The element 41 is shunted by a normally open switch 42. The switch 42 constitutes the signalling device per se and the system is designed to detect the closure of switch 42 as a signal. This is accomplished taking into account the following parameters. With switch 42 open and the hand set in place on the cradle of the subset 11, the loop resistance as detected at the tip (T) terminal is a function of the line resistance $L_r$ which will normally not exceed 1400 Ω. The subset DC resistance ranges from infinity when on hook to 100 to 300 ohms when off hook.

The base resistance 40 of the signalling subset 12 in a non signalling condition is selected at six thousand ohms although a slightly lower resistance 4.8k Ω is possible if no guard band is desired. Below 4.8k Ω the signalling subset 12 would appear to the central office as an OFF hook condition at maximum loop and would interfere with the telephone system operation. Thus, a theoretical minimum value for resistance element 40 is 4.8k Ω and optimum lowest value is 6.0k Ω. The value of resistance 41 may range from the minimum practical detection capability at the central office eg. 1k Ω to up to 70k Ωs. For convenience, resistance element 41 is illustrated at 10k Ω. In the embodyment of FIG. 1, the signalling subset 12 exhibits DC resistance of 15,000 ohms normally and 5,000 ohms during signalling. This constituted a stepped change in DC loop resistance of 10,000 ohms. Such a step change is easily detected at the central office and easily converted to digital format for handling a digital computer.

When the telephone hand set goes off hook, its DC resistance in the order of 100–300 Ω controls. The loop resistance as seen by the central office is principally that of the handset and telephone subset balancing network and the effect of the signalling subset is negligible.

The values of the signalling subset 12 resistances 40 and 41 are selected to provide slight attenuation to ringing signals and speech.

Suffice it to say that the telephone subset 11 is operable in its normal manner and the signalling subset 12 provides a step change in DC loop resistance whenever the switch 42 closes.

In a typical application, the switch 42 is a thermally responsive switch designed to monitor an area for excess temperature indicative of a fire. Another typical application is as a pressure or magnetically operated switch associated with a closed area to denote entry. Of course, the switch 42 may be operated by any of a myrid number of sensors and the central computer 25 need only be programmed to associate the line and signalling condition to provide the appropriate display output.

FIG. 1, as indicated above, describes the simplest form of this invention. It must be immediately recognized that given the capability of detecting a step change in DC loop resistance at a subscriber station, one can expand upon the concept and provide a multitapped resistance element with multiple switches and provide a plurality of signals. Moreover, when the taps of the resistance element are selected in a logical manner, the total number of signals which may be transmitted without change at the subscriber signalling subset is greatly enhanced. For example, employing a three tap (four section) resistance element, employing conventional binary notation up to sixteen different signalling conditions may be sensed.

Such a signalling subset is illustrated in FIG. 2. This expanded signalling subset comprises a plurality of resistance elements 51–55 which may be selectively shunted by associated switches 60–63. The resistance element 51 is preferably adjustable about a nominal value such as 6000–10k ohms to compensate for variations in line resistance and to bring the total loop DC resistance to a preferred nominal value such as 6000 ohms. The remaining resistance elements 52–55 are selected with different values such as:

| | |
|---|---|
| Resistance 52 | 1k |
| Resistance 53 | 2k |
| Resistance 54 | 4k |
| Resistance 55 | 8k |

Operation of switches 60–63 produce unique detectable changes in the loop resistance as follows:

| SWITCH CONDITION | SIGNAL SUBSET 12 RESISTANCE IN OHMS |
|---|---|
| All switches open | 21k |
| All switches open except 60 | 20k |
| All switches open except 61 | 19k |
| All switches open except 62 | 17k |
| All switches open except 63 | 13K |

Since the value of each resistance, 52–55, is selected in discrete steps logically related, additional unique codings are possible with a switch in an open condition represented by 0 and closed as a 1. The total possibilities are as follows:

| | |
|---|---|
| 4 bit binary code, 16 possibilities | Loop resistance varies from 21k to 6k in 1k steps. |

It is apparent that a large number of functions may be signalled using this simple tapped resistance element provided the central office A/D converter has a discrimination capability equal to the binary weighted value of the resistance element.

The remainder of the system is similar to FIG. 2 as including a telephone subset 11 with its ringer 11*a*, switch hook contacts 11*b*, all connected to a telephone line pair 13. The central office equipment basically combines a number of similar lines in multiplexer 23 connected to computer 25. The computer 25 must have address information supplied by the multiplexer 23 and the data which is simply the DC current levels indicative of the switch closure combination.

In a typical system, the levels incurred employing this invention are:

| RESIS-TANCE | CONDITION | CURRENT FROM 48v CENTRAL OFFICE BATTERIES |
|---|---|---|
| 75k | open circuit | — |
| 6k–69k | various signalling condition | 0.7 to 8 ma |
| 6k | least loop bridge resistance | 8 ma |
| 4.8k–6k | guard band | |
| 2.4k–4.8k | minimum to maximum loop resistance for reliable line relay operation | 10–20 ma |
| 100–300 | normal subset off hook resistance | 30–100 ma |

It is apparent that the signalling band is totally outside of the range of normal ON hook or OFF hook current levels and therefore no interference exists in either mode of usage of the system.

As is also apparent, the subscriber station has the very simplest encoder, namely a tapped resistance element plus one or more event actuated switches. All complexity is located at the telephone central office. Given today's capability in mini-computers, certain logical determinations can also be made at the telephone central office to provide priority information. The subscriber encoder or signalling subset required to register priority in signals is shown in FIG. 3. As illustrated in FIG. 2, incremental changes in steps as small as 1k Ω may occur. The greatest single switch incremental change in resistance occurs when switch 63 opens or closes producing an 8k Ω change in resistance. Any larger change would only occur if two sensors operated simultaneously during one scan cycle of the computer 25 and multiplexer 23. Where the sensors which close switches are dissimilar in nature and function, such simultaneous closure is unlikely. For example, if switch 63 is an intrusion switch and switch 64 is a fire or temperature sensor, the likelihood of a simultaneous occurrence of both alarm conditions (in less than one second, for example) is unlikely.

FIG. 3 shows an alternate embodyment including a loop balancing resistor 61 similar to resistor 51 of FIG. 2 and an array of resistor segments or sections 62, 63 and 64, each with its associated switch 65, 66 and 67 to be operated by external means to provide its normal signal. Again the values of the resistors may be logically related or may have any difference value desired within the range of 1k Ω to 64k Ω to produce different changes in loop resistance. The maximum normal change in resistance during a single scan cycle of the central office equipment would be that of the largest value of resistance 65, 66 or 67. However, an additional switch 70 has been added to the signalling subset in parallel with the string of resistors 62–64. Whenever switch 70 closes, the maximum possible resistance change occurs indicative of a highest priority event, eg. a fire. The central office computer can thus be programmed to recognize the larger the change in resistance, the higher the priority of the event. The central office computer may also be programmed to detect and disregard or act upon slow drift of resistance due to aging, disablement such as open circuit of a single or multiple pair of other anomolies recognizing the ultimate simplicity of the only valid signals.

UTILITY METER

A further extension of the concept of this invention afford simple remote reading of utility meters. It is recognized that remote reading has been accomplished, however, such systems have not been generally accepted since the equipment to encode the current reading for transmission is relatively complex and hardly justifies the capital investment necessary for each utility meter. However, employing this invention and particularly relegating a memory function to the central computer of utility office, low cost utility meter reading is now a reality.

Figure 5:
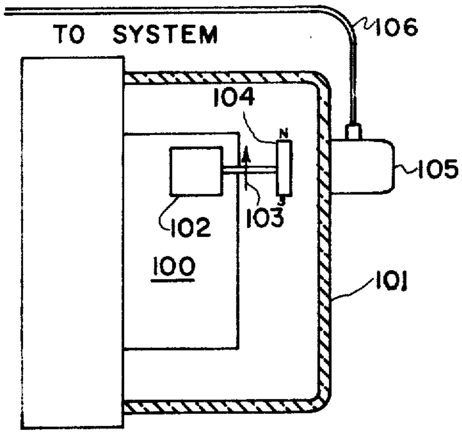
FIG. 5 is a vertical sectional view of a watt hour meter including a power consumption sensor in accordancne with this invention.
Figure 6:
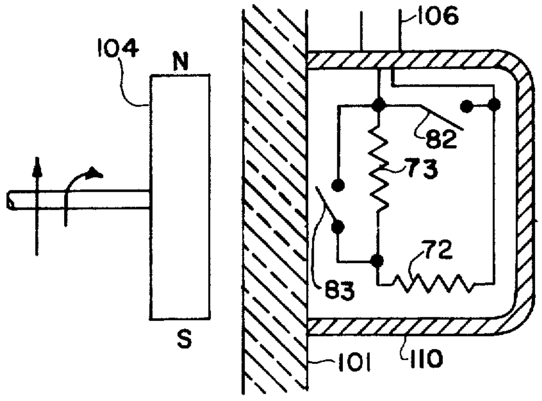
FIG. 6 is a vertical sectional view of the sensor of FIG. 5.
Figure 4:
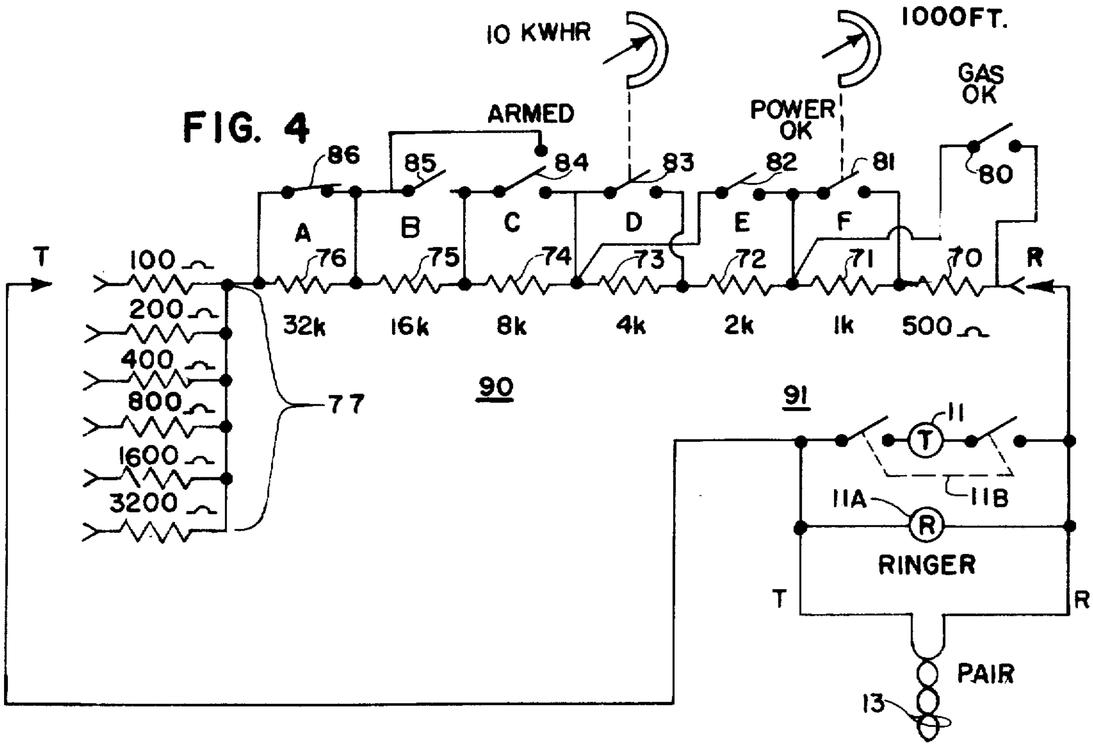
FIG. 4 is an electrical schematic of a combined alarm and utility reading system.

Refer now to FIG. 4 in conjunction with FIGS. 5 and 6 for an understanding of this phase of the invention.

A resistance chain similar to that of FIG. 3 appears in FIG. 4. In this case, a series chain of seven resistance elements 70–76 are used having selected values of where R = 500 ohms and *n* are the numbers 1, 2, 4, 8, 16, 32, 64. Each resistance element has an associated switch 80–86 similar to switches 70 and 65–67 of FIG. 3. A tapped padding resistance array 77 of different values is used to bring the minimum resistance to a standard level such as 6k–10k ohms. The above elements all constitute the signalling subset 90 connected across the tip (T) and ring (R) conductors in parallel with the subscriber subset 91.

The switches 80–86 perform the following functions:

| SWITCH | FUNCTION | RESIS-TANCE Ω |
|---|---|---|
| 86 | fire | 32k |
| 85 | unauthorized entry | 16k |
| 84 | arm 85 | 8k |
| 83 | power consumed 10kw | 4k |
| 82 | power switch OK | 2k |
| 81 | 1000 $ft^3$ gas consumed | 1k |
| 80 | gas switch OK | 500 |

The switch 86, for fire alarm produces the most drastic change in loop resistance, namely 32k ohms. The next most significant occurrence, namely an unauthorized entry is noted by the opening of switch 85 which produces a 16k ohm change in resistance. Switch 85 is enabled by switch 84, which normally is closed by the householder.

The remaining switches 80–83 are used for utility usage monitoring. To provide the simplest form of sensing and signalling at the subscriber station, switches 81 and 83 are each respectively connected mechanically or magnetically coupled to a dial in an existing utility meter having one revolution during a period equal to some quantity or measure of power, gas or water. If the central office multiplexer samples each line once each second, the dial selected on any meter cannot have a full rotation greater than one half second under maximum usage rate conditions. The switch and sensor are designed to be open for one half revolution and closed for the other half cycle. Therefore, two successive changes of state mark the consumption of one revolution of the appropriate dial.

The central office computer includes a memory function which stores the count for each subscriber thereby monitoring energy consumption for billing purposes.

A protective feature is included in each utility monitor in the form of auxiliary switches 80 and 82 which normally remain open. If either switch 80 or 82 is closed, it produces a unique step change in resistance which is detected at the central computer as an abnormality in the operation of the meter requiring a service call or inspection. One situation is where tampering has occurred as is explained in connection with FIGS. 5 and 6.

Disclosed in FIGS. 5 and 6 are mechanical features of the energy monitoring sensors designed for attachment to existing meters with minimum modification to produce accurate monitoring without electrical contact with the meters.

In FIG. 5 a conventional watt hour meter 100 is shown with a glass housing 101 and internal meter 102 with a plurality of dials with pointers 103. The one dial having a normal maximum rate of rotation equal to no more than one half revolution per scan period of the system is selected. A switch operator, in this case a permanant magnet 104 is mounted on an extension of the dial pointer shaft and is positioned adjacent to the non ferromagnetic cover 101. Secured to the outer face of the cover 101 is a switch assembly 105 having leads 106 connecting the meter reader to the signalling subset of FIG. 4.

The switch assembly 105 is illustrated in FIG. 6 with a cover 110 which may be of ferromagnetic material for shielding purposes or may merely be a plastic weather shield. Contained within the cover 110 are switches 82 and 83 as well as resistance elements 72 and 73 as illustrated in FIG. 4. Switches 82 and 83 are preferably of the ferreed type which are well known in the telephone art. Switch 83 is positioned adjacent to the window 101 and actuated once each revolution of magnet 104. The switch 83 remains closed for approximately one half of each revolution of the shaft carrying the magnet 104. The exact duty cycle of the switch 83 is not critical since it only requires two switch operations per half cycle. Resistance changes are detected at the telephone central office or utility office as the case may be. Resistance 73 has a value of 4k so the central office computer is programmed to register each such change as the consumption of a predetermined quantity of energy.

The switch 82 is also a magnetically operated ferreed or similar switch having a greater sensitivity than the switch 83 but positioned remote from the field of the magnet 104, or positioned orthogonal to the switch actuating field of magnet 104 and thus is insensitive to it in any position or movement. However if any foreign magnetic field such as leakage from the meter or external source exists in the region, switch 82 will operate producing a 6kΩchange in resistance which is detected at the central office as a fault. A suitable claim may be registered and the fault corrected by service personnel.

The switch embodyment of FIGS. 5 and 6 is designed with a non electrical contact objective in mind to minimize the possibility of current leakage into the telephone system through the utility sensor. Therefore magnetic actuation is used. In the case where such a requirement is not controlling, a rotating switch (180° ON, 180° OFF) will be preferred because of very high reliability and low cost.

In each of the embodyments described, the most obvious forms of signals have been described. However, the same signalling system employing a single step of the resistance and a single switch may be used to signal any binary message to the central computer. For example, switch 81 of FIG. 5 may be instead available to the subscriber for use in responding at a particular time to an opinion poll question communicated by radio, television or other media. An instant opinion may be obtained from a large number of households without the use of the television subset and or voice communication. Other applications of this system are legion.

The above described embodyments of this invention are merely descriptive of its principles and are not to be considered limiting. The scope of this invention instead shall be determined from the scope of the following claims, including their equivalents.

I claim:

1. A signalling system for use in conjunction with a telephone subscriber set, a pair of line conductors forming a subscriber loop and a central location for concentrating a number of subscriber lines comprising a resistance element including a plurality of series connected discrete resistances;

said resistance element connected across said line conductors without any active or reactive elements in D.C. conduction relationship with said subscriber loop and in parallel with said telephone subscriber set;

at least one normally open switch connected across one of said discrete resistances;

said switch being closable to produce a step change in D.C. resistance of the subscriber loop indicative of a signalling condition;

said resistance element having a resistance with said switch closed greater than the minimum value interfering with normal central office switching or voice conversation.

2. The combination in accordance with claim 1 wherein said resistance element includes at least two discrete resistances and individual normally open switches connected across each of said discrete resistances, said discrete resistances having different values whereby the D.C. loop resistance changes a different amount with closure of one or the other of said switches.

3. The combination in accordance with claim 2 wherein said discrete resistances have different values differing by a factor $n$ where $n$ is an integer.

4. The combination in accordance with claim 2 wherein the switch associated with the larger of said discrete resistances is operable by the most significant signalling event.

5. The combination in accordance with claim 2 including multiple means connected to a plurality of subscriber loops for sequentially sampling the D.C. loop resistance of each of said subscriber loops, means for connecting the loop resistance monitored into digital signal format and means for displaying a discrete change of loop resistance as a signal condition.

6. The combination in accordance with claim 2 including adjustable resistance means in series with said resistance element for adjusting the total loop D.C. resistance to a predetermined value.

7. The combination in accordance with claim 5 wherein said central location includes battery means for applying D.C. to said subscriber loop, said means for converting the loop resistance into digital signal format is connected to the same battery as said subscriber loop.

8. The combination in accordance with claim 2 including additional switch means connected across a plurality of said discrete resistances whereby the closure of said additional switch means produces a greater change in resistance than the operation of any one of said individual switches whereby a higher priority signal of greater detectability may be produced.

9. The combination in accordance with claim 2 wherein the said resistances differ in value by different values whereby the closure of any individual one of said switch means or any combination thereof produces a different change in D.C. loop resistance.

10. A telephone subscriber installation comprising in combination a pair of line conductors, a telephone subset including a pair of hook switches for connecting said subset across said line conductors, a ringer connected across said line conductors, a signalling subset without any active or reactive elements connected across said line conductors, said signalling subset comprising a resistive element comprising a plurality of series connected resistances having a total value between 5,000 and 70,000 ohms, individual switch means connected across respective resistances, said individual switch means being operative to change the resistance of the subscriber installation when said hook switches are open, said resistances having different values whereby the operation of different switches is identifiable and detectable by the magnitude in any change in loop current through the line conductors when connected to a D.C. power source.

11. The combination in accordance with claim 10 wherein said switches are operable to denote different alarm conditions.

12. The combination in accordance with claim 10 where said resistances are each of different values, each differing from the next lower value by a factor *n* where *n* is an integer of each other whereby the operation of any single or any combination of switches produces a discrete resistance change.

13. The combination in accordance with claim 10 wherein said signalling subset includes an adjustable series resistance connected in series with said resistive element for adjusting the nominal D.C. resistance through said subscriber station.

14. The combination in accordance with claim 10 including an additional switch means for selectively shunting a plurality of said resistances to produce a discrete change in resistance greater than the resistance change produced by the operation of any of the other of said individual switch means.

15. Apparatus for sensing and signalling an indication of utility consumption as function of operation of such meter comprising, switch means coupled to said meter for producing a switch closing and opening for a predetermined consumption as registered by said meter, a resistance element including at least two discrete resistances connected in series, said switch means connected to shunt one of said discrete resistances upon the closing thereof, a pair of line conductors connectable to a central utility data recording center;

said resistance element connected across said line conductors without any active or reactive elements whereby said resistance element determines in part the loop resistance as seen by a central utility data recording center and said switch means producing a detectable change in loop resistance with each predetermined utility comsumption.

16. The combination in accordance with claim 15 wherein said line conductors constitute a telephone line and said resistance element is connected in parallel with the ringer of a telephone set connected to said line conductors.

17. Apparatus for sensing and signalling an indication of utility consumption as function of operation of such meter comprising, switch means coupled to said meter for producing a switch closing and opening for a predetermined consumption as registered by said meter, a resistance element including at least two discrete resistances connected in series, said switch means connected to shunt one of said discrete resistances upon the closing thereof, a pair of line conductors connectable to a central utility data recording center;

said resistance element connected across said line conductors whereby said resistance element determines in part the loop resistance as seen by a central utility data recording center, said switch means producing a detectable change in loop resistance with each predetermined utility consumption;

wherein said apparatus includes an enclosure securable to the face of a utility meter with said switch in position to be actuated by a magnet in said meter, said switch means including a second switch, a second resistance element selectively shunted by said second switch, said second resistance element connected in series with said first mentioned resistance element, said second switch being magnetically operated and positioned to respond to magnetic fields originating from sources other than said utility meter magnet to operate and produce a discrete change in the resistance across said apparatus.

18. The combination in accordance with claim 17 wherein said second resistance element is different in value from said first resistance whereby the operation of said first or second switches are distinguishable.

19. Apparatus for sensing and signalling an indication of utility consumption as function of operation of such meter comprising, switch means coupled to said meter for producing a switch closing and opening for a predetermined consumption as registered by said meter, a resistance element including at least two discrete resistances connected in series, said switch means connected to shunt one of said discrete resistances upon the closing thereof, a pair of line conductors connectable to a central utility data recording center;

said resistance element connected across said line conductors whereby said resistance element determines in part the loop resistance as seen by a central utility data recording center;

said switch means producing a detectable change in loop resistance with each predetermined utility consumption;

wherein said switch means comprises a magnetically actuated switch and said meter includes a magnet coupled for movement with a consumption monitoring element of said meter to produce sequential opening and closing of said switch with predetermined quality of utility consumption.

20. The combination in accordance with claim 18 wherein said monitoring element of such meter is a rotatable indicator and said magnet is mounted thereon for rotation cyclically into switch opening and closing relation with said switch.

* * * * *